United States Patent
Kim et al.

(10) Patent No.: US 10,912,021 B2
(45) Date of Patent: Feb. 2, 2021

(54) METHOD FOR OPERATING WAKE-UP RECEIVER IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hyunhee Park, Seoul (KR); Suhwook Kim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 56 days.

(21) Appl. No.: 16/337,902

(22) PCT Filed: Sep. 25, 2017

(86) PCT No.: PCT/KR2017/010536
§ 371 (c)(1),
(2) Date: Mar. 28, 2019

(87) PCT Pub. No.: WO2018/062787
PCT Pub. Date: Apr. 5, 2018

(65) Prior Publication Data
US 2020/0029276 A1   Jan. 23, 2020

Related U.S. Application Data

(60) Provisional application No. 62/401,901, filed on Sep. 30, 2016, provisional application No. 62/408,076, (Continued)

(51) Int. Cl.
*H04W 52/02* (2009.01)
*H04W 76/11* (2018.01)
(Continued)

(52) U.S. Cl.
CPC ........ *H04W 52/0206* (2013.01); *H04W 76/11* (2018.02); *H04W 80/02* (2013.01); *H04W 84/12* (2013.01)

(58) Field of Classification Search
None
See application file for complete search history.

(56) References Cited

U.S. PATENT DOCUMENTS

2010/0315982 A1* 12/2010 Choi ............... H04W 52/02
370/311
2011/0305177 A1* 12/2011 Woo ................ H04W 52/0229
370/311

(Continued)

OTHER PUBLICATIONS

PCT International Application No. PCT/KR2017/010536, International Search Report dated Sep. 25, 2017, 4 pages.
(Continued)

*Primary Examiner* — Saba Tsegaye
(74) *Attorney, Agent, or Firm* — Lee Hong Degerman Kang Waimey

(57) ABSTRACT

A method by which a station (STA) operates in a wake up receiver (WUR) mode in a wireless LAN (WLAN) system, according to one embodiment of the present invention, comprises the steps of: entering into the WUR mode by turning off a WLAN transceiver of the STA and turning on a WUR receiver of the STA; starting a timer by entering into the WUR mode; and turning on the WLAN transceiver of the STA when the timer is completed or a wake-up signal for waking up the STA is detected through the WUR receiver, wherein the timer can indicate the remaining time for which the STA can maintain the WUR mode until the STA receives a predetermined WUR signal for confirming the presence of an associated access point (AP).

12 Claims, 21 Drawing Sheets

Related U.S. Application Data filed on Oct. 14, 2016, provisional application No. 62/490,004, filed on Apr. 25, 2017.

(51) Int. Cl.
*H04W 80/02* (2009.01)
*H04W 84/12* (2009.01)

(56) References Cited

U.S. PATENT DOCUMENTS

| | | |
|---|---|---|
| 2014/0269462 A1 | 9/2014 | Jia et al. |
| 2015/0006668 A1 | 1/2015 | Wootton et al. |
| 2016/0044598 A1 | 2/2016 | Wei et al. |
| 2016/0374019 A1* | 12/2016 | Park ........................ H04W 8/24 |
| 2018/0069683 A1* | 3/2018 | Huang .................. H04L 5/0092 |

OTHER PUBLICATIONS

Park, et al., "LP-WUR (Low-Power Wake-Up Receiver) Follow-Up", doc.: IEEE 802.11-16/0341r0, Mar. 2016, 9 pages.
Seok, et al.,"Coexistence Mechanism for Wakeup Radio Signal", doc.: IEEE 802.11-16/1114r0, Aug. 2016, 11 pages.

* cited by examiner

FIG. 5
(a) 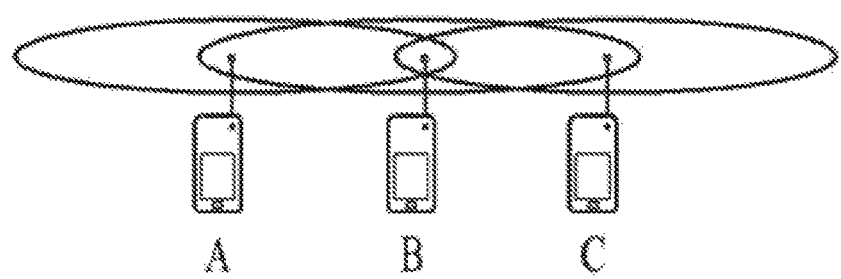
(b) 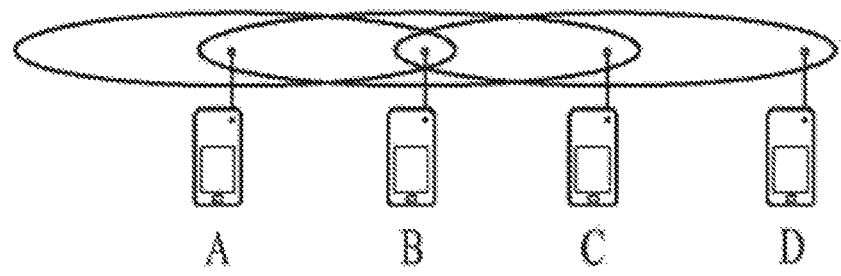

FIG. 6
(a)
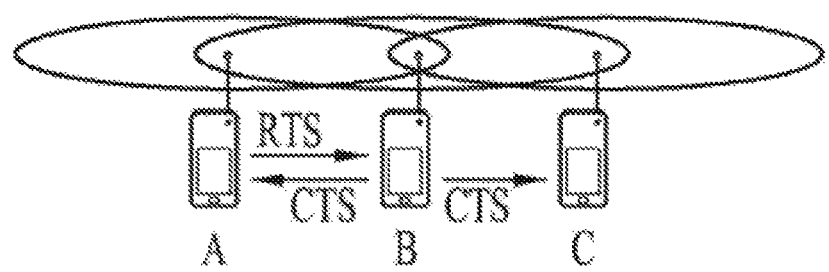
(b)
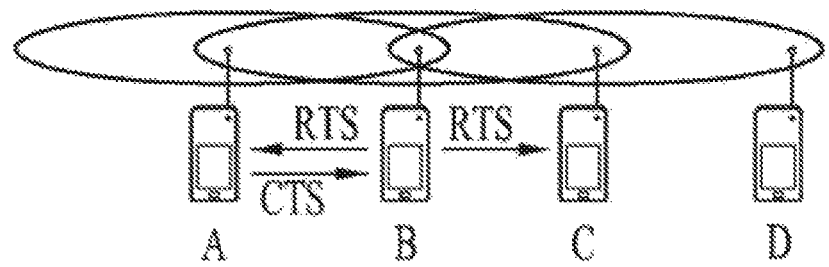

METHOD FOR OPERATING WAKE-UP RECEIVER IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/010536, filed on Sep. 25, 2017, which claims the benefit of U.S. Provisional Application No. 62/401,901, filed on Sep. 30, 2016, 62/408,076, filed on Oct. 14, 2016, and 62/490,004, filed on Apr. 25, 2017, the contents of which are all hereby incorporated by reference herein in their entireties.

BACKGROUND OF THE INVENTION

Field of the Invention

The present invention relates to a method for transmitting and receiving a frame in a wireless LAN system and, more particularly, to a method and an apparatus for operating a low-power wake-up receiver (LP-WUR) compatible with an 802.11 WLAN system.

Related Art

Standards for wireless LAN (WLAN) technology are being developed as Institute of Electrical and Electronics Engineers (IEEE) 802.11. IEEE 802.11a and IEEE 802.11b employ an unlicensed band of 2.4 GHz or 5 GHz, wherein IEEE 802.11b provides a transmission speed of 11 Mbps, and IEEE 802.11a provides a transmission speed of 54 Mbps. IEEE 802.11g employs orthogonal frequency-division multiplexing (OFDM) at 2.4 GHz and provides a transmission speed of 54 Mbps. IEEE 802.11n employs multiple-input multiple-output OFDM and provides a transmission speed of 300 Mbps for four spatial streams. IEEE 802.11n supports a channel bandwidth of up to 40 MHz and provides a transmission speed of 600 Mbps.

The WLAN standards have evolved into IEEE 802.11ax via IEEE 802.11ax, which employs a bandwidth of up to 160 MHz, supports eight spatial streams, and supports a speed of up to 1 Gbit/s, and the standardization of IEEE 802.11ax is under discussion.

SUMMARY OF THE INVENTION

An aspect of the present invention is to provide a method and an apparatus for efficiently and accurately operating a low-power wake-up receiver (LP-WUR) compatible with an 802.11 WLAN system.

The present invention is not limited to the aforementioned aspect, and other aspects may be derived from embodiments of the present invention.

In accordance with one aspect of the present invention, there is provided a method in which a station (STA) operates in a wake-up receiver (WUR) mode in a wireless local area network (WLAN) system, the method including: entering a WUR mode by turning off a WLAN transceiver of the STA and turning on a WUR receiver of the STA; starting a timer as entering the WUR mode; and turning on the WLAN transceiver of the STA when the timer expires or a wake-up signal to wake up the STA is detected through the WUR receiver, wherein the timer may indicate a remaining time for which the STA is able to remain in the WUR mode until receiving a predetermined WUR signal to confirm presence of an access point (AP) associated with the STA.

In accordance with another aspect of the present invention, there is provided a STA operating in a WUR mode in a WLAN system, the STA including: a WLAN transceiver; a WUR receiver; and a processor configured to enter a WUR mode by turning off the WLAN transceiver and turning on the WUR receiver, wherein the WUR receiver may start a timer as entering the WUR mode, and may turn on the WLAN transceiver of the STA when the timer expires or a wake-up signal to wake up the STA is detected through the WUR receiver, and the timer may indicate a remaining time for which the STA is able to remain in the WUR mode until receiving a predetermined WUR signal to confirm presence of an AP associated with the STA.

The predetermined WUR signal to confirm the presence of the AP may include at least one of a WUR beacon frame and a wake-up signal to wake up another STA.

The predetermined WUR signal to confirm the presence of the AP may include at least one of a basic service set identifier (BSSID), an MAC address, a partial BSSID, and a BSS color of the AP.

When the predetermined WUR signal to confirm the presence of the AP is received before the timer expires, the STA may reset the timer to an initial value and may remain in the WUR mode.

The initial value of the timer may be a value that the STA receives from the AP using the WLAN transceiver before entering the WUR mode or a value determined based on the transmission period of the WUR beacon frame.

When the WLAN transceiver is turned on due to the expiration of the timer, the STA may attempt to detect an intra-BSS frame through the WLAN transceiver for a certain period of time, and may return to the WUR mode or may perform an AP scanning procedure depending on whether the intra-BSS frame is detected.

Alternatively, when the WLAN transceiver is turned on due to the expiration of the timer, the STA may request a response from the AP through the WLAN transceiver, and may return to the WUR mode or may perform an AP scanning procedure depending on whether the response is received from the AP.

According to an embodiment of the present invention, a LP-WUR compatible with a WLAN system is provided, thereby reducing the power consumption of a STA. Further, the LP-WUR operates on the basis of a timer for identifying the presence of an AP, thereby preventing a STA operating in a WUR mode from not waking up with the AP lost or preventing the AP from not being able to find a STA operating in the WUR mode Effects other than the aforementioned effects may be derived from embodiments of the present invention.

BRIEF DESCRIPTION OF THE DRAWINGS

FIG. 5 illustrates a hidden node and an exposed node.

FIG. 6 illustrates an RTS and a CTS.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description relates to a method and an apparatus for efficiently utilizing a channel having a wide band in a wireless LAN (WLAN) system. To this end, a WLAN system to which the present invention is applied will be described in detail.

Figure 1:
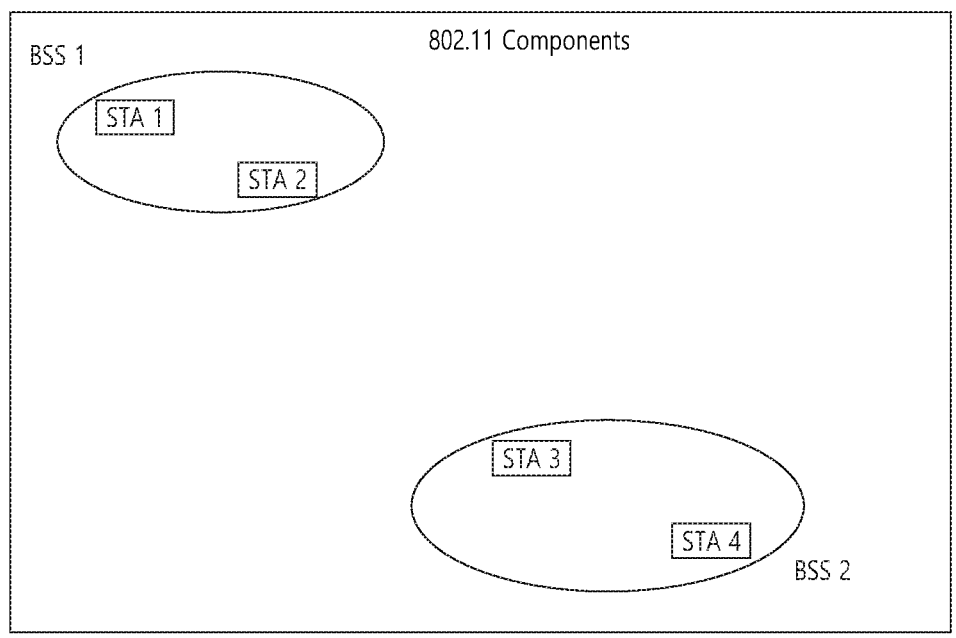
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
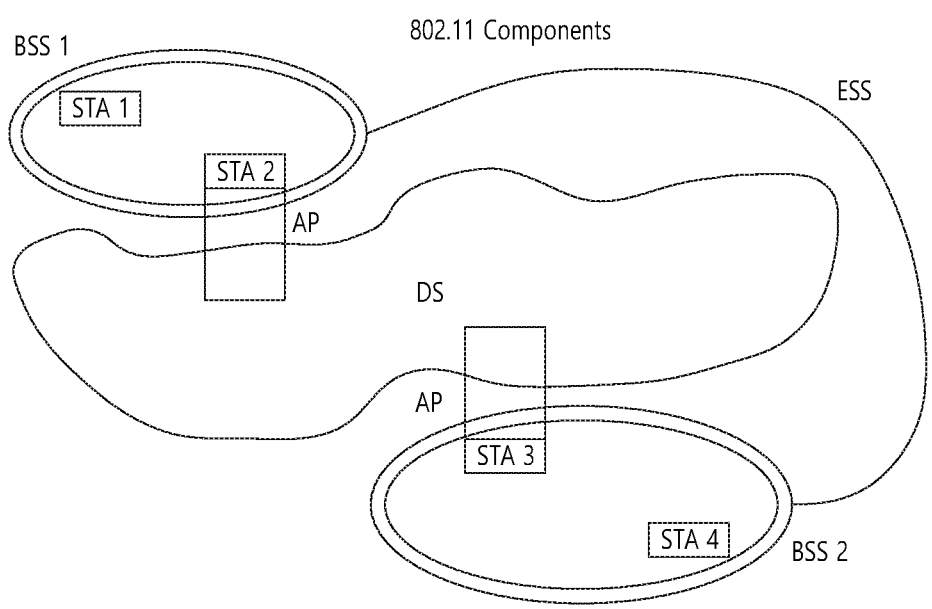
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

The operation of a STA operating in a WLAN system may be described regarding a layer structure. The layer structure may be configured by a processor in terms of a device configuration. A STA may have a plurality of layer structures. For example, the 802.11 standards mainly deal with an MAC sublayer on a data link layer (DDL) and a physical (PHY) layer. The PHY may include a physical layer convergence procedure (PLCP) entity and a physical medium dependent (PMD) layer. The MAC sublayer and the PHY layer conceptually include management entities respectively called an MAC sublayer management entity (MLME) and a physical layer management entity (PLME). These entities provide a layer management service interface in which a layer management function works.

To provide an accurate MAC operation, a station management entity (SME) is present in each STA. The SME is a layer-independent entity that is present in a separate management plane or can be seen to be off to the side. Although accurate functions of the SME are not illustrated in detail in this document, the SME may generally function to collect a layer-dependent state from various layer management entities (LMEs) and to similarly set the values of layer-specific parameters. Generally, the SME may perform these functions on behalf of a general system management entity and may implement a standard management protocol.

The foregoing entities interact in various manners. For example, the entities may interact by exchanging GET/SET primitives. A primitive refers to an element or a set of parameters related to a particular purpose. An XX-GET.request primitive is used to request the value of a given MIB attribute (management information-based attribute information). An XX-GET.confirm primitive is used to return an appropriate MIB attribute information value when a Status field indicates "success", and to return an error indication in a Status field otherwise. An XX-SET.request primitive is used to request an indicated MIB attribute to be set to a given value. When the MIB attribute indicates a particular operation, the XX-SET.request primitive is to request the operation to be performed. An XX-SET.confirm primitive is used to identify that an indicated MIB attribute is set to a requested value when the Status field indicates "success", and to return an error condition in the Status field otherwise. When the MIB attribute indicates a particular operation, the XX-SET.confirm primitive is to identify that the operation is performed.

The MLME and the SME may exchange various MIME_GET/SET primitives through an MLME_service access point (SAP). Further, various PLME_GET/SET primitives may be exchanged between the PLME and the SME through a PLME_SAP and may be exchanged between the MLME and the PLME through an MLME-PLME_SAP.

Link Setup Process

Figure 3:
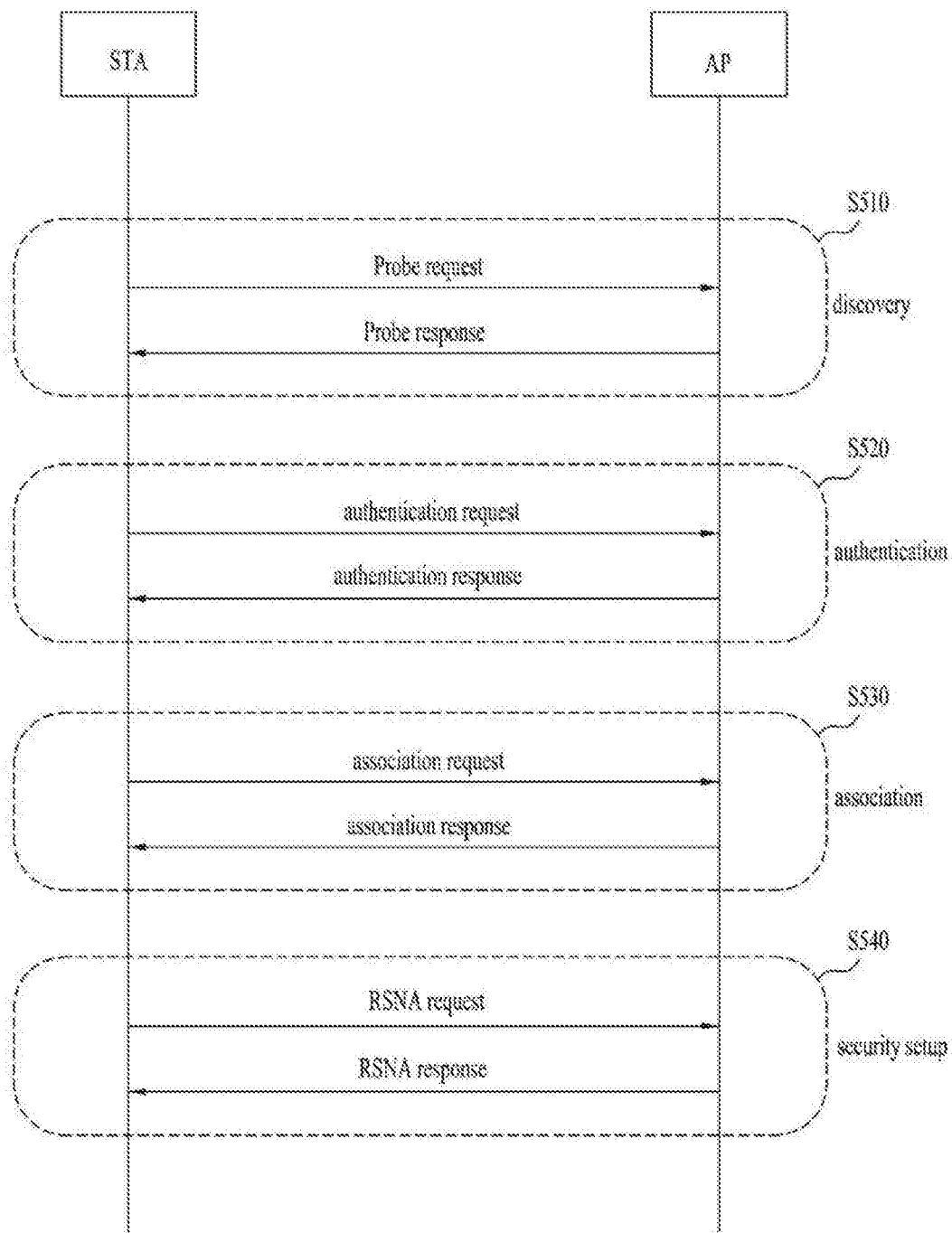
FIG. 3 illustrates a general link setup process.

FIG. 3 illustrates a general link setup process.

To set up a link to a network and to transmit and receive data, a STA first needs to discover a network, to perform authentication, to establish association, and to perform an authentication procedure for security. The link setup process may also be referred to as a session initiation process or a session setup process. Discovery, authentication, association, and security setup processes of the link setup process may be collectively referred to as an association process.

An illustrative link setup process is described with reference to FIG. 3.

In step S510, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning.

Scanning Methods Include Active Scanning and Passive Scanning

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning waits for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

Comparing active scanning with passive scanning, active scanning involves a shorter delay and less power consumption than passive scanning.

After the STA discovers the network, an authentication process may be performed in step S520. The authentication process may be referred to as a first authentication process to be clearly distinguished from the following security setup operation in step S540.

The authentication process may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group. These examples are some illustrative pieces of information that can be included in the authentication request/response frames and may be replaced with other information. Further, additional information may be further included.

The STA may transmit the authentication request frame to the AP. The AP may determine whether to allow the authentication of the STA on the basis of the information included in the received authentication request frame. The AP may provide the authentication processing result to the STA via the authentication response frame.

When the STA is successfully authenticated, an association process may be performed in step S530. The association process includes a process in which the STA transmits an association request frame to the AP and the AP transmits an association response frame to the STA in response.

The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability.

The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

These examples are some illustrative pieces of information that can be included in the association request/response frames and may be replaced with other information. Further, additional information may be further included.

After the STA is successfully associated with the network, a security setup process may be performed in step S540. The security setup process in step S540 may be referred to as an authentication process through a robust security network association (RSNA) request/response. The authentication process in step S520 may be referred to as the first authentication process, and the security setup process in step S540 may be referred to simply as an authentication process.

The security setup process in step S540 may include a process of setting up a private key through four-way handshaking, for example, through an extensible authentication protocol over LAN (EAPOL) frame. Further, the security setup process may be performed according to a security method not defined in IEEE 802.11.

Medium Access Mechanism

In a WLAN system according to IEEE 802.11, a fundamental access mechanism of the medium access control (MAC) is a carrier sense multiple access with collision avoidance (CSMA/CA) mechanism. The CSMA/CA mechanism is also called a distributed coordination function (DCF) of the IEEE 802.11 MAC and basically employs a listen-before-talk access mechanism. According to this type of access mechanism, an AP and/or a STA may perform clear channel assessment (CCA) of sensing a radio channel or medium during a predetermined time interval (e.g., DCF inter frame space (DIFS)) before starting transmission. As a result of sensing, when the medium is determined to be idle, the AP and/or a STA starts to transmit a frame through the medium. When the medium is detected to be occupied, the AP and/or may configure a delay interval (e.g., a random backoff period) for medium access, may wait for the delay interval, and may then attempt to transmit a frame rather than starting transmission. As the random backoff period is applied, it is expected that a plurality of STAs attempts to transmit a frame after waiting for different times, thereby minimizing a collision.

Further, the IEEE 802.11 MAC protocol provides a hybrid coordination function (HCF). The HCF is based on the DCF and a point coordination function (PCF). The PCF is a polling-based synchronous access method, which refers to a periodic polling method that enables all receiving APs and/or STAs to receive a data frame. The HCF has enhanced distributed channel access (EDCA) and HCF-controlled channel access (HCCA). EDCA employs a contention-based access method for a provider to provide a data frame to a plurality of users, and HCCA employs a contention-free channel access method using a polling mechanism. Further, HCF includes a medium access mechanism to improve the QoS of a WLAN and can transmit QoS data both in a contention period (CP) and a contention-free period (CFP).

Figure 4:
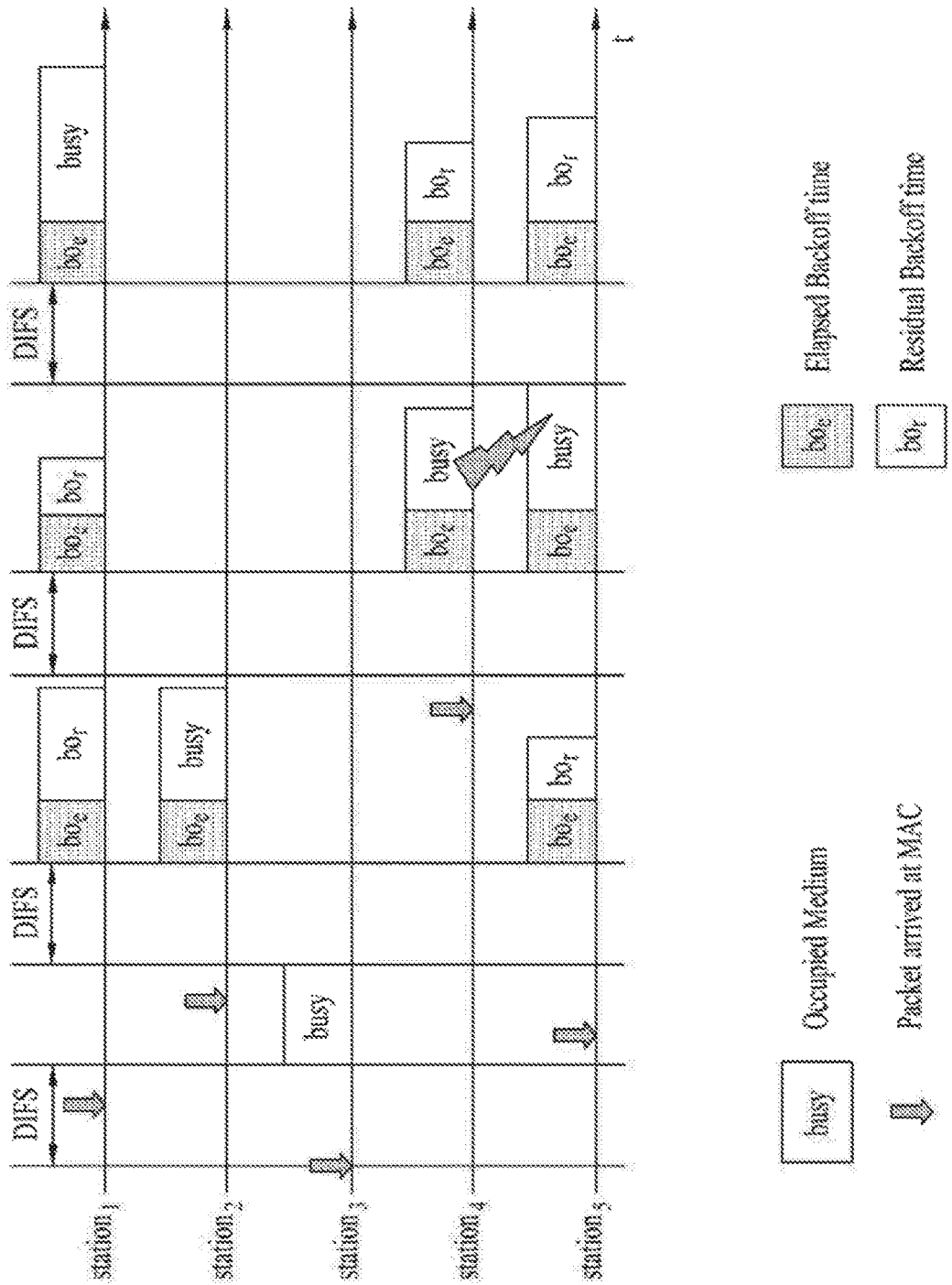
FIG. 4 illustrates a backoff process.

FIG. 4 illustrates a backoff process.

An operation based on a random backoff period is described with reference to FIG. 4. When an occupied or busy medium is changed to an idle status, a plurality of STAs may attempt to transmit data (or a frame). Here, to minimize a collision, each of the STAs may select a random backoff count, may wait for a slot time corresponding to the count, and may then attempt transmission. The random backoff count may have a packet number value and may be determined to be one value ranging 0 to CW. Here, CW is a contention window parameter value. The CW parameter is assigned CWmin as an initial value, and a double value may be taken when transmission fails (e.g., when an ACK of a transmitted frame is not received). When the CW parameter value is CWmax, the STAs may attempt data transmission while maintaining the CWmax value until data transmission is successful. When data transmission succeeds, the CW parameter value is reset to the CWmin value. The CW, CWmin, and CWmax values are preferably set to $2^n-1$ (n=0, 1, 2, ... ).

When a random backoff process is started, a STA continue to monitor a medium while counting down backoff slots according to a determined backoff count value. When the monitored medium is in an occupied status, the STA suspends the countdown and waits. When the medium becomes idle, the STA resumes the remaining countdown.

Referring to FIG. 4, when a packet to transmit reaches the MAC of STA 3, STA 3 determines that a medium is idle for a DIFS and may immediately transmit a frame. The remaining STAs determine that the monitored medium is busy and waits. During this period, STA 1, STA 2, and STA 5 may have data to transmit. When the monitored medium is determined to be idle, each STA may wait for a DIFS and may then count down backoff slots according to a random backoff count value selected by each STA. In FIG. 4, STA 2 selects the smallest backoff count value, and STA 1 selects the largest backoff count value. That is, FIG. 4 shows that the remaining backoff time of STA 5 is shorter than the remaining backoff time of STA 1 at the time when STA 2 completes a backoff count and starts frame transmission. STA 1 and STA 5 suspend a countdown and wait while STA 2 is occupying the medium. When the medium occupied by STA2 is released and returns to the idle status, STA 1 and STA 5 wait for a DIFS and then resume the suspended backoff count. That is, STA 1 and STA 5 may count down remaining backoff slots equivalent to the remaining backoff time and may then start frame transmission. Since the remaining backoff time of STA 5 is shorter than that of STA 1, STA 5 starts to transmit a frame. STA 4 may also have data to transmit while STA 2 is occupying the medium. Here, when the medium becomes idle, STA 4 may wait for a DIFS, may then perform a countdown according to a random backoff count value selected by STA 4, and may start frame transmission. In FIG. 4, the remaining backoff time of STA 5 may accidentally coincide with the random backoff count value of STA 4, in which case a collision may occur between STA 4 and STA 5. When a collision occurs, both STA 4 and STA 5 cannot receive an ACK and thus fail to transmit data. In this case, STA 4 and STA 5 may double a CW value, may select a random backoff count value, and may perform a countdown. Meanwhile, while the medium is occupied due to transmission by STA 4 and STA 5, STA 1 may wait. Then, when the medium returns to the idle status, STA 1 may wait for a DIFS, and may start frame transmission after the elapse of the remaining backoff time.

Sensing Operation of STA

The CSMA/CA mechanism also includes virtual carrier sensing in addition to physical carrier sensing in which an AP and/or STA directly senses a media. Virtual carrier sensing is intended to solve any problems that may occur during media access, such as a hidden node problem. For virtual carrier sensing, the MAC of a WLAN system may use a network allocation vector (NAV). The NAV is a value that corresponds to the time remaining until a medium becomes available, which is indicated by an AP and/or STA currently using the medium or having the right to use the medium to another AP and/or STA. Therefore, a set NAV value corresponds to a period during which a medium is scheduled to be used by an AP and/or STA transmitting a corresponding frame, and a STA receiving the NAV value is prohibited from accessing the medium during the corresponding period. The NAV may be set according to, for example, the value of a Duration field of an MAC header of a frame.

Further, a robust collision detection mechanism is introduced in order to reduce the possibility of a collision, which is described with reference to FIG. 5 and FIG. 7. An actual carrier sensing range and a transmission range may not be the same but are assumed to be the same for the convenience of description.

FIG. 5 illustrates a hidden node and an exposed node.

FIG. 5(a) illustrates an example of a hidden node, in which STA A is communicating with STA B, and STA C has information to transmit. Specifically, STA A is transmitting information to STA B, but STA C may determine that a medium is idle when performing carrier sensing before transmitting data to STA B. This is because STA C may not sense transmission (i.e., occupancy of the medium) by STA A at the position of STA C. In this case, since STA B simultaneously receives information from both STA A and STA C, a collision occurs. Here, STA A may be a hidden node of STA C.

FIG. 5(b) illustrates an example of an exposed node, in which STA B is currently transmitting data to STA A, and STA C has information to transmit to STA D. In this case, when STA C performs carrier sensing, STA C may determine that a medium is occupied due to the transmission by STA B. Thus, although STA C has information to transmit to STA D, since the medium is sensed to be occupied, STA C needs to wait until the medium becomes idle. However, since STA A is actually out of the transmission range of STA C, there may be no collision between transmission from STA C and transmission from STA B for STA A, in which case STA C may unnecessarily wait until STA B stops transmission. Here, STA C is an exposed node of STA B.

FIG. 6 illustrates an RTS and a CTS.

To efficiently use the collision avoidance mechanism in the examples illustrated in FIG. 5, a short signaling packet, such as a request-to-send (RTS) packet and a clear-to-send (CTS) packet, may be used. A RTS/CTS between two STAs may allow overhearing of a neighboring STA(s), thus enabling the neighboring STA(s) to consider information transmission between the two STAs. For example, when a STA to transmit data transmits a RTS frame to a STA to receive the data, the STA receiving the data may transmit a CTS frame to neighboring STAs, thereby indicating that the STA will receive the data.

FIG. 6(a) illustrates an example of a method for solving a hidden node issue, in which it is assumed that both STA A and STA C attempt to transmit data to STA B. When STA A transmits a RTS to STA B, STA B transmits a CTS to both STA A and STA C which are around STA B. As a result, STA C waits until data transmission between STA A and STA B is completed, thus avoiding a collision.

FIG. 6(b) illustrates an example of a method for solving an exposed node issue, in which STA C overhears RTS/CTS transmission between STA A and STA B and thus can determine that no collision occurs even though transmitting data to another STA (e.g., STA D). That is, STA B transmits a RTS to all neighboring STAs, and only STA A, which actually has data to transmit, transmits a CTS. Since STA C receives only the RTS and does not receive the CTS from STA A, STA C can determine that STA A is out of the carrier sensing of STC C.

Power Management

As described above, in the WLAN system, a STA needs to perform channel sensing before performing transmission and reception, and always sensing a channel causes continuous power consumption of the STA. Power consumption in a reception state is not significantly different from power consumption in a transmission state, and maintaining the reception state also causes a great burden on a STA having limited power (i.e., operating by a battery). Thus, when the STA maintains a reception standby state in order to continuously sense a channel, the STA inefficiently consumes power without any special advantage in the throughput of a WLAN. To solve this problem, the WLAN system supports a power management (PM) mode of a STA.

The power management mode of a STA is divided into an active mode and a power save (PS) mode. By default, a STA operates in the active mode. A STA operating in the active mode maintains an awake state. The awake state is a state in which a normal operation, such as frame transmission/reception and channel scanning, is possible. A STA operating in the PS mode operates, switching between a sleep state (or a doze state) and the awake state. A STA operating in the sleep state operates with minimal power and performs neither frame transmission and reception nor channel scanning.

As a STA operates in the sleep state as long as possible, power consumption is reduced, thus increasing the operating time of the STA. However, since it is impossible to transmit and receive frames in the sleep state, the STA cannot operate unconditionally for a long time. When the STA operating in the sleep state has a frame to transmit to an AP, the STA can switch to the awake state and can transmit the frame. On the other hand, when the AP has a frame to transmit to the STA, the STA in the sleep state cannot receive the frame and cannot recognize that there is the frame to receive. Therefore, the STA may need to periodically switch to the awake state in order to identify whether there is a frame to be transmitted to the STA (and to receive the frame if present).

The AP may periodically transmit a beacon frame to STAs in a BSS. The beacon frame may include a traffic indication map (TIM) information element. The TIM information element may include information indicating that the AP has buffered traffic for STAs associated with the AP and will transmit a frame. The TIM element includes a TIM used to indicate a unicast frame and a delivery traffic indication map (DTIM) used to indicate a multicast or broadcast frame.

Figure 7:
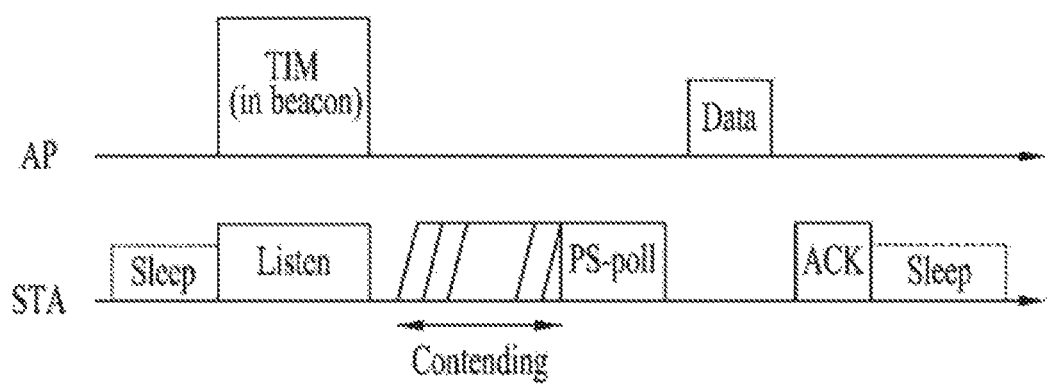
FIGS. 7 to 9 illustrate the operation of a STA receiving a TIM.
Figure 8:
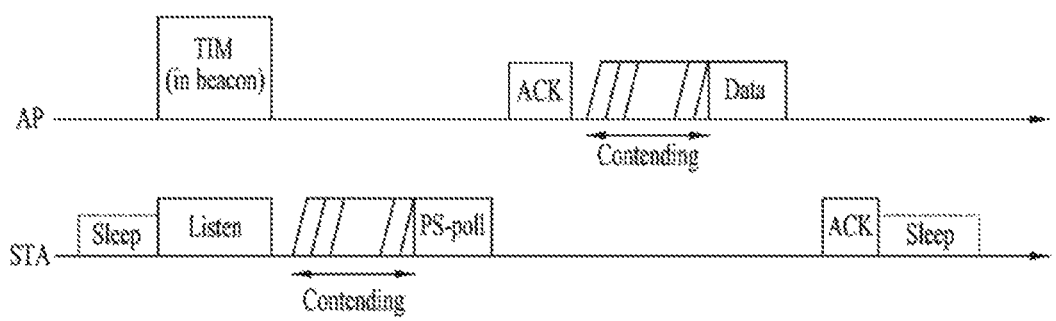
Figure 9:
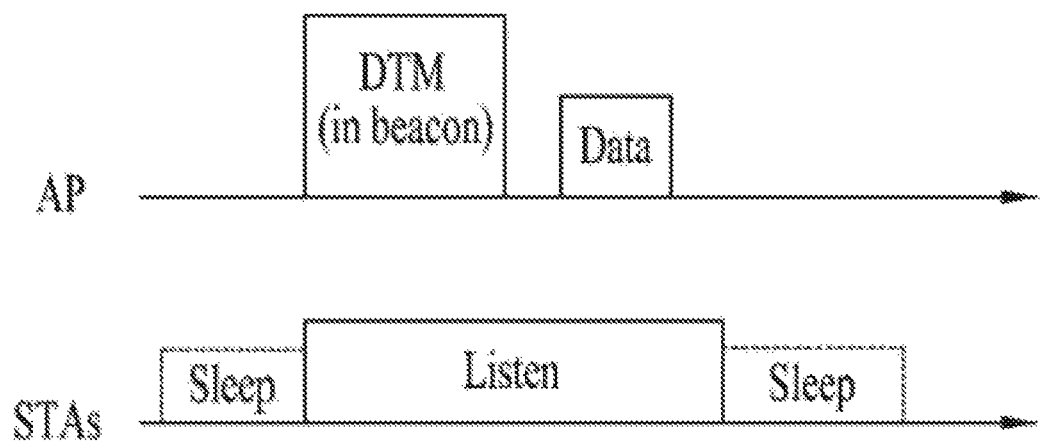

FIGS. 7 to 9 illustrate the operation of a STA receiving a TIM in detail.

Referring to FIG. 7, a STA switches from the sleep state to the awake state in order to receive a beacon frame including a TIM from an AP, and analyzes a received TIM element, thereby identifying that there is buffered traffic to be transmitted to the STA. After the STA contends with other STAs to access a medium for PS-Poll frame transmission, the STA may transmit a PS-Poll frame to the AP in order to request data frame transmission. Upon receiving the PS-Poll frame transmitted by the STA, the AP may transmit a frame to the STA. The STA may receive a data frame and may transmit an acknowledgment (ACK) frame of the data frame to the AP. The STA may then switch back to the sleep state.

As illustrated in FIG. 7, the AP may operate according to an immediate response mode of transmitting a data frame after a predetermined time (e.g., short inter-frame space (SIFS)) after receiving the PS-Poll frame from the STA. When the AP fails to prepare a data frame to transmit to the STA during the SIFS time after receiving the PS-Poll frame, the AP may operate according to a deferred response mode, which will be described with reference to FIG. 8.

In an example illustrated in FIG. 8, a STA switches from the sleep state to the awake state, receives a TIM from an AP, and transmits a PS-Poll frame to the AP via contention in the same manner as in the example of FIG. 7. When the AP receives the PS-Poll frame but fails to prepare a data frame during SIFS, the AP may transmit an ACK frame to the STA instead of a data frame. After the AP transmits the ACK frame, when a data frame is ready, the AP may perform contention and may then transmit the data frame to the STA. The STA may transmit an ACK frame indicating that the data frame has been successfully received to the AP and may switch to the sleep state.

FIG. 9 is an example in which an AP transmits a DTIM. STAs may switch from the sleep state to the awake state in order to receive a beacon frame including a DTIM element from an AP. The STAs can identify that a multicast/broadcast frame will be transmitted through a received DTIM. The AP may transmit data (i.e., the multicast/broadcast frame), without transmission and reception of a PS-Poll frame, immediately after transmitting the beacon frame including the DTIM. The STAs may receive the data while continuously maintaining the awake state after receiving the beacon frame including the DTIM, and may switch back to the sleep state after the data reception is completed.

General Frame Structure

Figure 10:
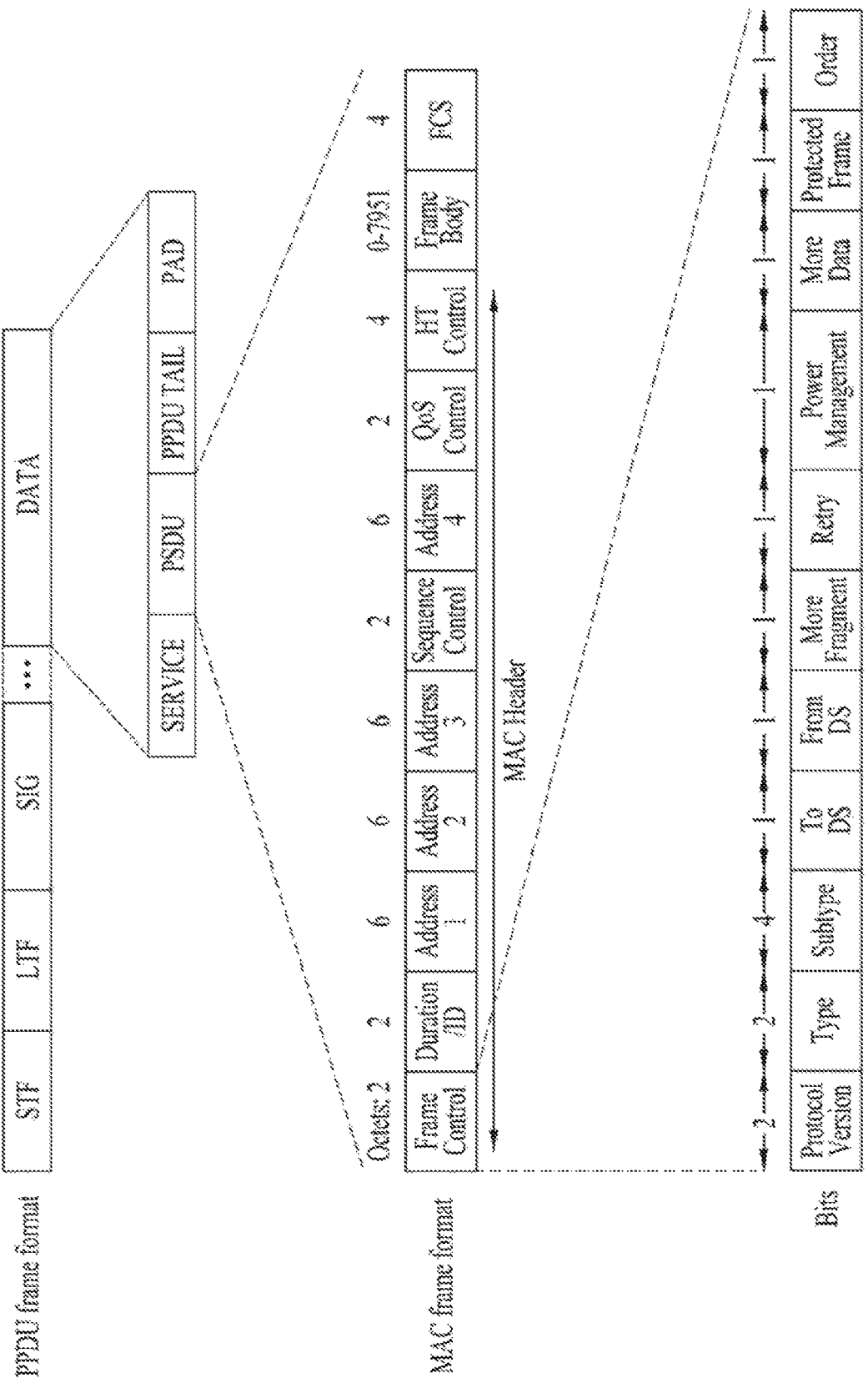
FIG. 10 illustrates an example of a frame structure used in an IEEE 802.11 system.

FIG. 10 illustrates an example of a frame structure used in an IEEE 802.11 system.

A physical-layer protocol data unit (PPDU) frame format may include a short training field (STF), a long training field (LTF), a signal (SIG) field, and a data field. A basic (e.g., non-high throughput (HT)) PPDU frame format may include a legacy STF (L-STF), a legacy-LTF (L-LTF), a SIG field, and a data field only.

The STF is a signal for signal detection, automatic gain control (AGC), diversity selection, precise time synchronization, or the like, and the LTF is a signal for channel estimation, frequency error estimation, or the like. The STF and the LTF may be collectively referred to as a PLCP preamble, and the PLCP preamble may be a signal for synchronization of an OFDM physical layer and channel estimation.

The SIG field may include a rate field and a length field. The rate field may include information on the modulation and coding rate of data. The length field may include information about the length of data. Additionally, the SIG field may include a parity bit, a SIG tail bit, or the like.

The data field may include a service field, a physical layer service data unit (PSDU), and a PPDU tail bit, and may also include a padding bit if necessary. Some bits of the service field may be used for synchronization of a descrambler at a receiver. The PSDU corresponds to an MAC protocol data unit (MPDU) defined in an MAC layer and may include data generated/used in a higher layer. The PPDU tail bit may be used to return an encoder to a zero state. The padding bit may be used to set the length of the data field to a predetermined unit.

The MPDU is defined according to various MAC frame formats, and a basic MAC frame includes an MAC header, a frame body, and a frame check sequence (FCS). An MAC frame may be configured as an MPDU and may be transmitted/received via a PSDU of a data part of the PPDU frame format.

The MAC header includes a frame control field, a duration/ID field, and an address field. The frame control field may include pieces of control information necessary for frame transmission/reception. The duration/ID field may be set to a time for transmitting a frame or the like.

The duration/ID field included in the MAC header may be set to a 16-bit length (e.g., B0 to B15). Content included in the duration/ID field may vary depending on the frame type and subtype, whether transmission is performed during a contention-free period (CFP), the QoS capability of a transmission STA, or the like. (i) In a control frame having a PS-Poll subtype, the duration/ID field may include the AID of transmission STA (e.g., via 14 LSB bits), in which 2 MSB bits may be set to 1. (ii) In frames transmitted during a CFP by a point coordinator (PC) or a non-QoS STA, the duration/ID field may be set to a fixed value (e.g., 32768). (iii) In other frames transmitted by a non-QoS STA or control frames transmitted by a QoS STA, the duration/ID field may include a duration value defined for each frame type. In a data frame or a management frame transmitted by a QoS STA, the duration/ID field may include a duration value defined for each frame type. For example, B15=0 set in the duration/ID field indicates that the duration/ID field is used to indicate TXOP duration, and B0-B14 may be used to indicate actual TXOP duration. The actual TXOP duration indicated by B0 to B14 may be one of 0 to 32767 and may have a unit in microseconds (us). However, when the duration/ID field indicates a fixed TXOP duration value (e.g., 32768), B15 may be set to 1 and B0 to B14 may be set to 0. In addition, when B14=1 and B15=1, the duration/ID field is used to indicate an AID, and B0 to B13 indicate one of AIDs from 1 to 2007. Sequence control, QoS control, and HT control subfields of the MAC header are mentioned in IEEE 802.11 specifications.

The frame control field of the MAC header may include protocol version, type, subtype, to DS, from DS, more fragment, retry, power management, more data, protected frame, and order subfields. Each subfield of the frame control field is mentioned in IEEE 802.11 specifications.

Low-Power Wake-Up Receiver (LP-WUR)

The general content of an LP-WUR that can be used in a WLAN system (e.g., an 802.11 system) will be described with reference to FIG. 11.

Figure 11:
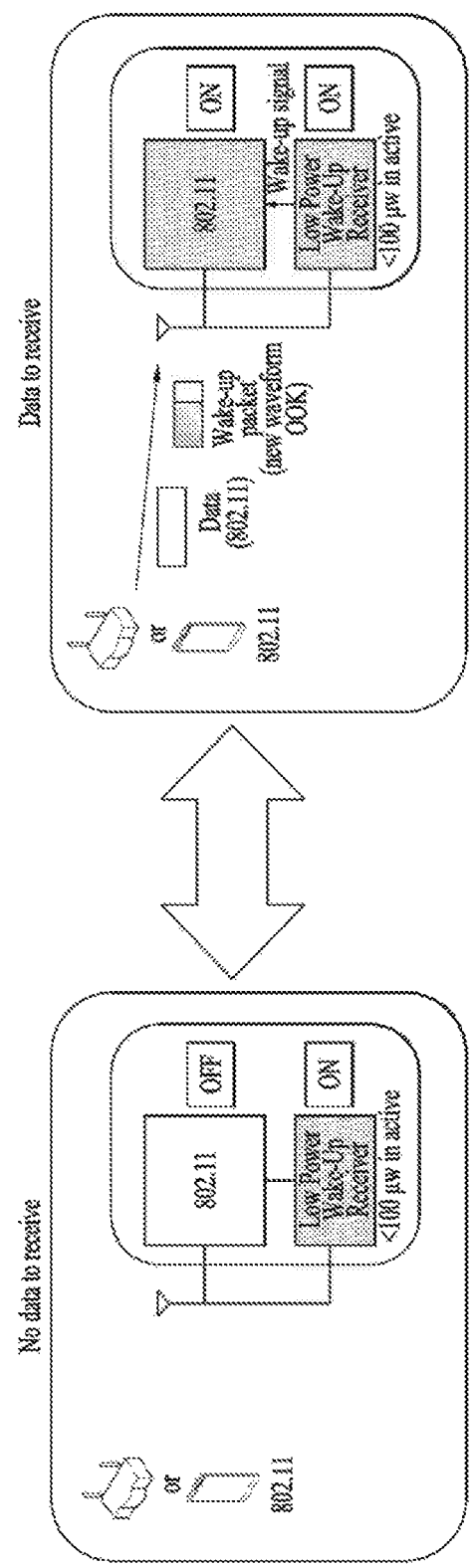
FIG. 11 illustrates an LP-WUR that can be used in a WLAN system (e.g., an 802.11 system).

Referring to FIG. 11, a receiver may be configured by combining a WLAN (hereinafter, a main radio) for main wireless communication and an LP-WUR.

The main radio is used for data transmission and reception, and may be powered off when there is no data to transmit or receive. When the main radio is powered off but there is a packet to receive, the LP-WUR can wake up the main radio. Therefore, user data is transmitted and received through the main radio.

The LP-WUR is not used for user data but can function only to wake up a receiver of the main radio. The LP-WUR may be a simple receiver form having no receiver and is activated while the main radio is turned off. It is preferable that the desired power consumption of the LP-WUR in an active state does not exceed 100 micro watts (uW). For a low-power operation, a simple modulation scheme, for example, an on-off keying (OOK) scheme, may be used, and a narrow bandwidth (e.g., 4 MHz or 5 MHz) may be used. The target transmission range (e.g., distance) of the LP-WUR may currently correspond to that in 802.11.

Figure 12:
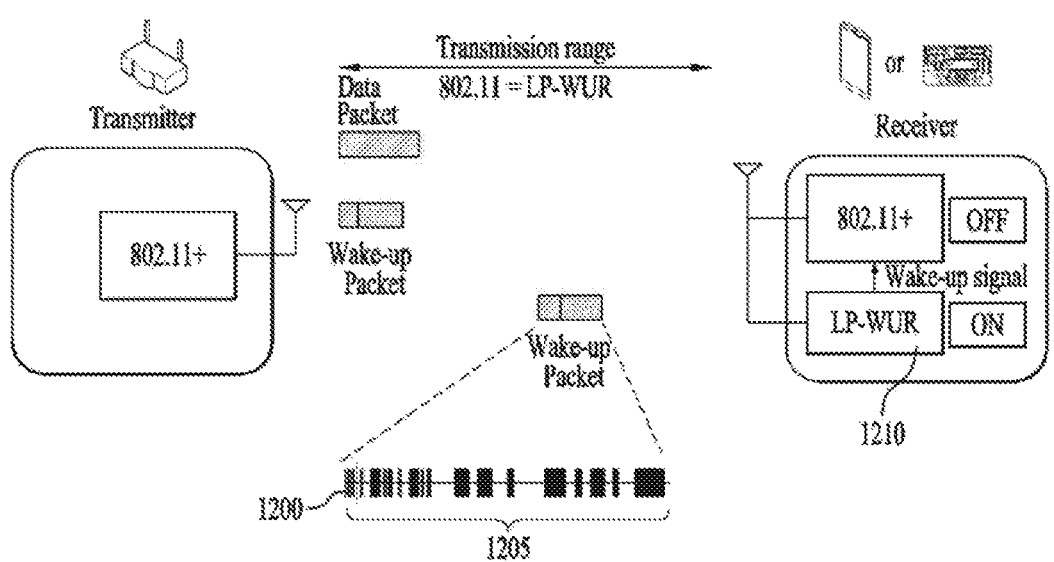
FIG. 12 illustrates the design and the operation of an LP-WUR.

FIG. 12 illustrates the design and the operation of an LP-WUR.

Referring to FIG. 12, a wake-up packet may include a WLAN preamble 1200 and a payload 1205 of the wake-up packet.

The WLAN preamble 1200 is for coexistence with a WLAN system, and an L-SIG of a WLAN may be used as the WLAN preamble 1200 for packet protection. Therefore, a third-party legacy STA can recognize, through the WLAN preamble 1200 of the wake-up packet, that the wake-up packet is not intended for the legacy STA and a medium of the current WLAN is occupied by another STA. However, an LP-WUR does not decode the WLAN preamble 1200 of the wake-up packet, because the LP-WUR that supports a narrowband and OOK demodulation does not support 802.11 signal reception.

The payload of the wake-up packet may be modulated by the OOK scheme. In one example, the payload of the wake-up packet may include at least one of a wake-up preamble MAC header (e.g., a recipient address or the like), a frame body, and a frame check sequence (FCS). The OOK modulation may be performed by modifying an OFDM transmitter.

As described above, the LP-WUR 1210 consumes very low power of 100 uW or less, and may be implemented as a small and simple OOK demodulator.

Since the wake-up packet needs to be designed to be compatible in the WLAN system, the wake-up packet may include a preamble (e.g., OFDM scheme) of a legacy WLAN and a new LP-WUR signal waveform (e.g., OOK scheme).

Figure 13:
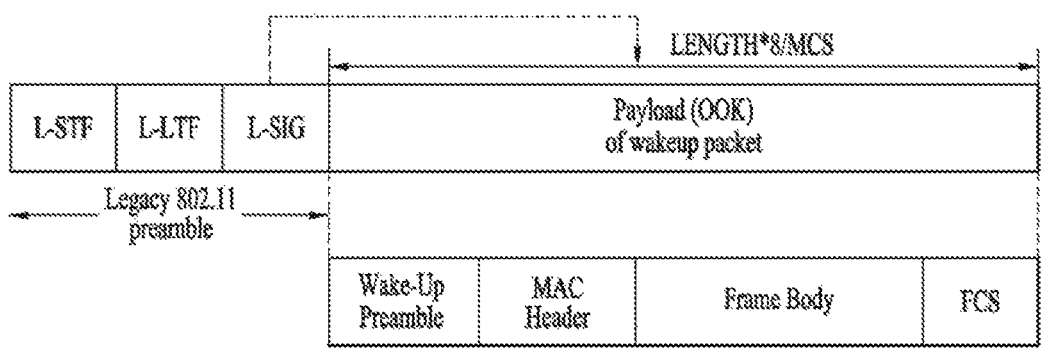
FIG. 13 illustrates an example of a wake-up packet.

FIG. 13 illustrates an example of a wake-up packet. The wake-up packet in FIG. 13 includes a legacy WLAN preamble for coexistence with a legacy STA.

Referring to FIG. 13, the legacy WLAN preamble may include an L-STF, an L-LTF, and an L-SIG. The WLAN STA (e.g., a third party) may detect the start of the wake-up packet through the L-STF. Also, the WLAN STA (e.g., the third party) may identify the end of the wake-up packet through the L-SIG. For example, the L-SIG field may indicate the length of a payload (e.g., OOK-modulated) of the wake-up packet.

The payload of the wake-up packet may include at least one of a wake-up preamble, an MAC header, a frame body, and an FCS. The wake-up preamble may include, for example, a PN sequence. The MAC header may include a receiver address. The frame body may include other information needed for wake-up. The FCS may include a cyclic redundancy check (CRC).

Figure 14:
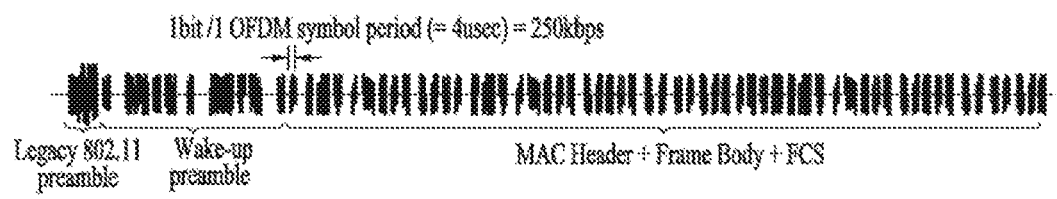
FIG. 14 illustrates the waveform of a wake-up packet.

FIG. 14 illustrates the waveform of the wake-up packet in FIG. 13. Referring to FIG. 14, in the payload of the wake-up packet which is OOK-modulated, one bit may be transmitted per OFDM symbol length (e.g., 4 usec). Thus, the data rate of the payload of the wake-up packet may be 250 kbps.

Figure 15:
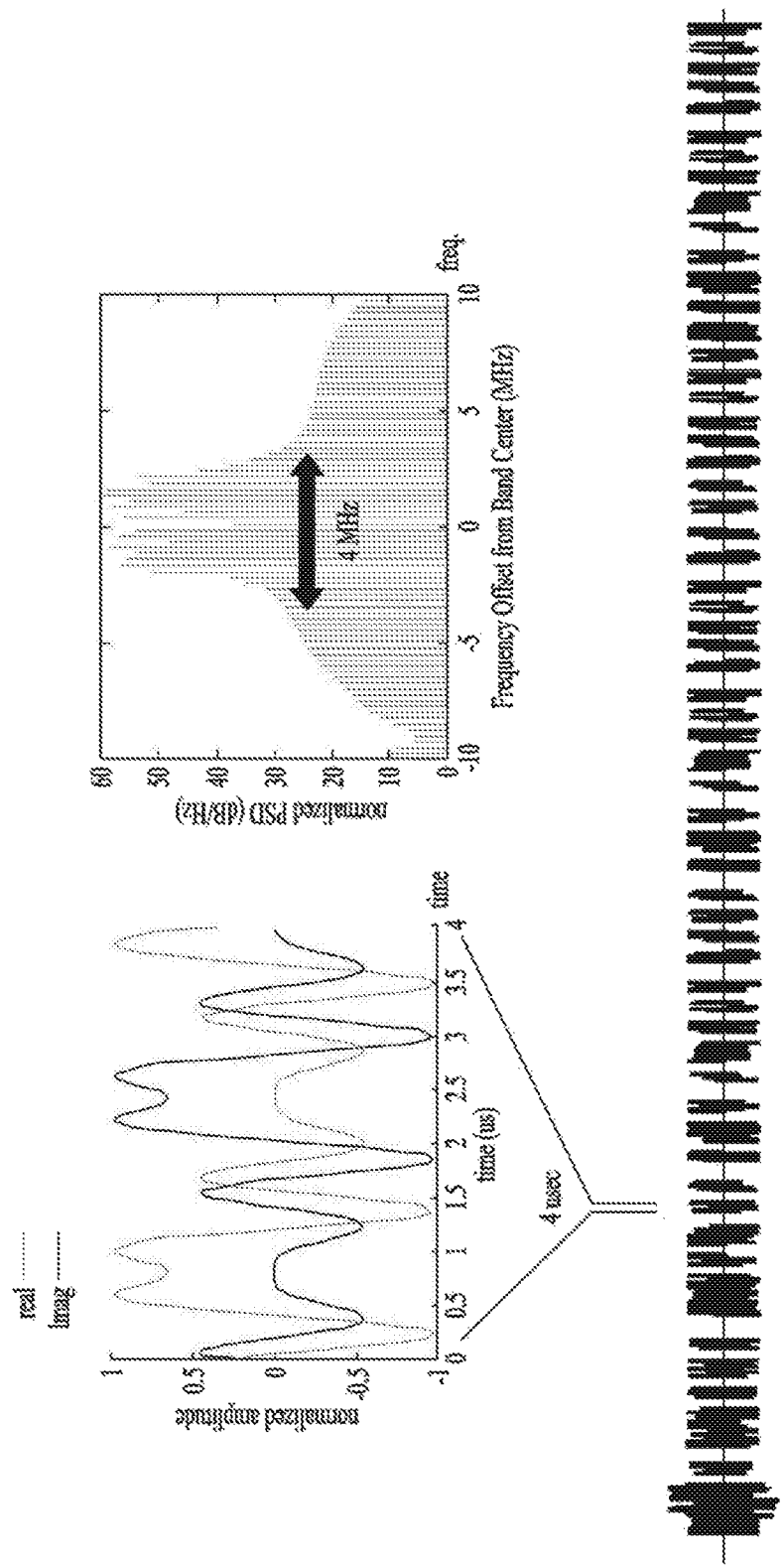
FIG. 15 illustrates the generation of a wake-up packet using an OFDM transmitter of a WLAN.

FIG. 15 illustrates the generation of a wake-up packet using an OFDM transmitter of a WLAN. In the WLAN, a phase-shift keying (PSK) OFDM transmission scheme is used, in which generating a wake-up packet by adding a separate OOK modulator for OOK modulation causes an increase in the cost of configuring a transmitter. Accordingly, a method of generating an OOK-modulated wake-up packet by reusing an OFDM transmitter will be described.

According to the OOK modulation scheme, a bit value of 1 is modulated into a symbol having power of a threshold value or higher (i.e., on), and a bit value of 0 is modulated into a symbol having power of less than the threshold value (i.e., off). On the contrary, it is also possible to define a bit value of 1 as power-off.

In the OOK modulation scheme, bit values 1/0 are indicated by power-on/power-off at corresponding symbol positions. This simple OOK modulation/demodulation scheme can save power consumed in signal detection/demodulation of a receiver and can reduce cost for implementing this scheme. In addition, OOK modulation of turning on and off a signal may be performed by reusing an existing OFDM transmitter.

The left graph in FIG. 15 shows a real part and an imaginary part of normalized amplitude during one symbol duration (e.g., 4 usec) with respect to a bit value of 1 that is OOK-modulated by an OFDM transmitter of an existing WLAN. The OOK modulation result of a bit value of 0 corresponds to power-off, which is not shown.

The right graph in FIG. 15 shows normalized power spectral density (PSD) on the frequency domain with respect to a bit value of 1 that is OOK-modulated by the OFDM transmitter of the existing WLAN. For example, central 4 MHz of a band may be used for the LP-WUR. In FIG. 15, it is assumed that the LP-WUR operates in a 4-MHz bandwidth, which is illustrated for the convenience of description, and a frequency bandwidth with a different size may be used. However, it is preferable that the LP-WUR operates in a bandwidth smaller than the operating bandwidth of the existing WLAN in order to reduce power consumption.

In FIG. 15, it is assumed that the width of a subcarrier (e.g., subcarrier spacing) is 312.5 kHz and the bandwidth of an OOK pulse corresponds to 13 subcarriers. As mentioned above, the 13 subcarriers correspond to about 4 MHz (i.e., 4.06 MHz=13*312.5 kHz).

In the existing OFDM transmitter, an input sequence of inverse fast Fourier transform (IFFT) is defined as s=13 subcarrier tone sequence, IFFT of the sequence s is performed by $X_t$=IFFT (s), after which a cyclic prefix (CP) with a 0.8 usec length is attached to the sequence, thereby obtaining a symbol having a length of about 4 us.

A wake-up packet may be referred to simply as a WUR signal or a WUR packet.

Figure 16:
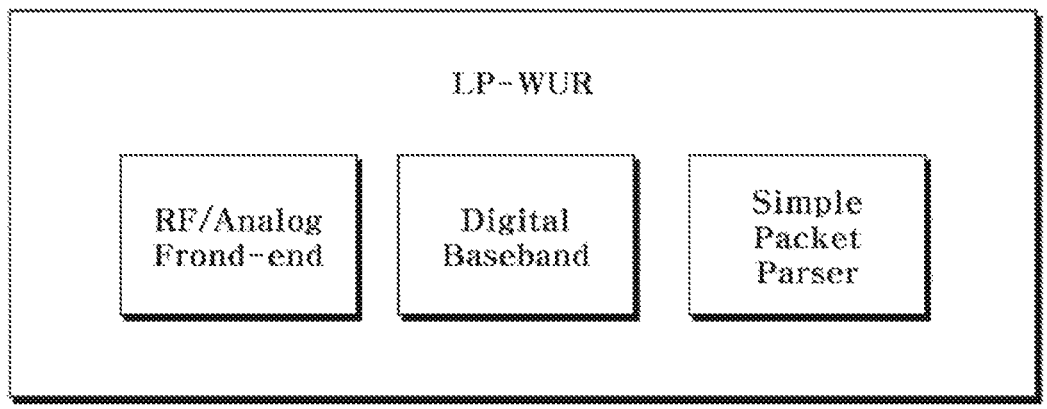
FIG. 16 illustrates the structure of an LP-WUR.

FIG. 16 illustrates the structure of an LP-WUR. Referring to FIG. 16, the LP-WUR may include an RF/analog front end, a digital baseband processor, and a simple packet parser. The configuration in FIG. 16 is merely an example, and a WUR receiver of the present invention is not limited to the structure of the LP-WUR illustrated in FIG. 16.

Hereinafter, a WLAN STA having a WUR receiver is referred to simply as a WUR STA.

Keep-Alive Checking for WUR STA

As mentioned above, to reduce the power consumption of a STA, the STA may monitor a WUR packet via a WUR receiver and may turn off a WLAN transceiver (TRX) (e.g., WUR mode). When an AP has WLAN data to transmit to the WUR STA, the AP transmits a WUR packet to the WUR STA to wake up the WLAN transceiver of the WLAN STA and transmits the WLAN data.

When the WUR STA is moved after turning off the WLAN transceiver and turning on only the WUR receiver, the WUR STA may depart from the coverage of a transmitter (e.g., the AP). The WUR STA and/or the transmitter may not recognize that the WUR STA is out of coverage even though the WUR STA departs from the coverage. For example, the WUR STA may mistake that there is no DL packet to be transmitted to the WUR STA when a WUR packet is not received, and the transmitter cannot transmit a DL packet to the WUR STA.

In order to detect that the WUR STA is out of the coverage of the AP, the WLAN transceiver may periodically wake up to monitor a WLAN beacon frame from the AP or to actively scan a neighboring AP, which, however, causes a reduction in the power saving effect.

An alternative method may be considered in which the WUR STA checks whether a WUR beacon frame is periodically transmitted, rather than a WLAN beacon frame, in which the WUR beacon frame is expected to be transmitted according to a much longer period than the WLAN beacon frame. Therefore, it is hardly reliable that the WUR STA checks the existence of the AP only using the WUR beacon frame.

In order to solve the foregoing problems, one embodiment of the present invention defines a new timer to set the time when a WUR STA needs to receive a WUR packet at least once from a transmitter (e.g., an AP) associated with the WUR STA when operating with only a WUR turned on. The WUR packet that needs to be received at least once is not limited to a WIR beacon or a WUR packet intended for the WUR STA but may include various WUR signals to identify the AP among WUR signals that can be received through the WUR.

For the convenience of description in the following embodiment, this timer is referred to as a WUR keep-alive timer. However, the present invention is not limited to this term, and various terms may be used including a BSS max idle period, an extended MAX idle period, a WUR MAX idle period, a listening interval, and a WUR idle-mode period/timer.

A WUR keep-alive timer may be a timer used by a WUR STA for a keep-alive check on an associated AP. When the WUR STA does not detect one or more WUR packets (e.g., a packet transmitted to the WUR STA/other WUR STAs) from a transmitter (e.g., an AP) associated with the WUR STA before the WUR keep-alive timer expires, the WUR STA may perform a procedure for a keep-alive check on the AP. The procedure for a keep-alive check may include, for example, an operation in which the WUR STA turns on a WLAN transceiver and attempts to receive a frame, such as a beacon, for a certain period of time or an operation in which the WUR STA attempts a handshake with the transmitter via a probe request/response frame, but is not limited thereto.

According to a method in which the WUR STA operates the WUR keep-alive timer, (i) the WUR STA starts the WUR keep-alive timer when a WUR is turned on. The initial value of the WUR keep-alive timer may be predefined, may be autonomously determined by the WUR STA in consideration of a WUR beacon period or the like, or may be obtained by the WUR STA from the AP, but is not limited thereto. (ii) When the WUR STA receives a WUR packet (e.g., an intra-BSS frame) that wakes up a WUR STA other than the WUR STA from the associated transmitter (e.g., the AP) before the WUR keep-alive timer expires, the WUR STA resets the WUR keep-alive timer. Resetting the WUR keep-alive timer may be returning the WUR keep-alive timer to the initial value but is not limited thereto. The WUR STA may restart the reset WUR keep-alive timer. (iii) When the WUR STA receives a WUR packet that wakes up the WUR STA from the associated transmitter (e.g., the AP) before the WUR keep-alive timer expires, the WUR STA stops the WUR keep-alive timer. The WUR STA may stop the WUR keep-alive timer regardless of whether the WUR packet that wakes up the WUR STA is an individual WUR packet only for a particular WUR STA or a multicast/broadcast WUR packet to wake up a plurality of WUR STAs. Then, the WUR STA wakes up the WLAN transceiver and transmits and receives a WLAN signal. (iv) When the WUR keep-alive timer expires, the WUR STA turns on the WLAN transceiver and performs a keep-alive check on the associated AP.

As a method for a WUR STA to perform a keep-alive check, for example, a passive keep-alive check method and an active keep-alive check method may be considered. The passive keep-alive check method and the active keep-alive check method will be described in detail with reference to FIG. 17 and FIG. 18.

Figure 17:
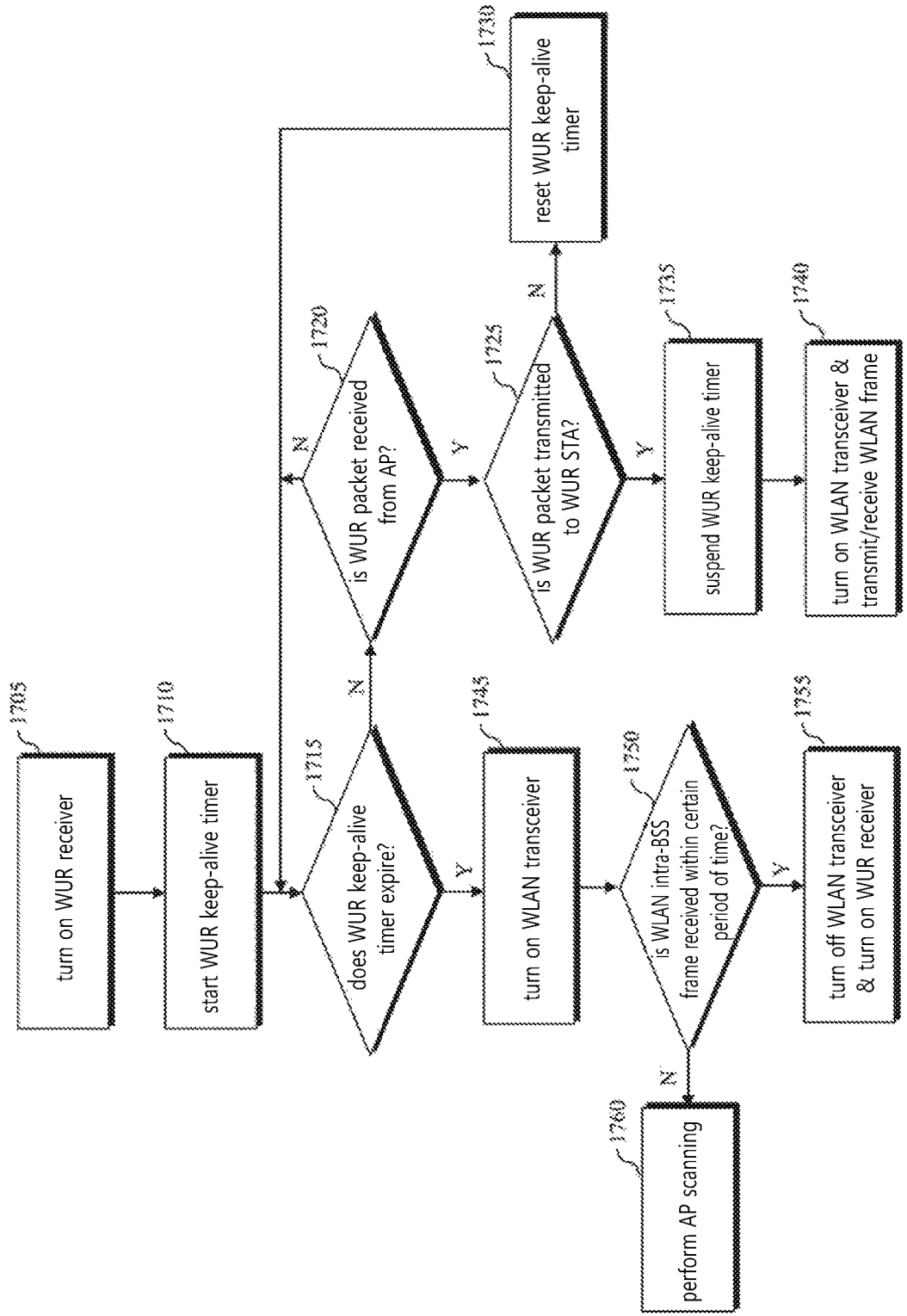
FIG. 17 illustrates the flow of the operation of a WUR keep-alive timer and a keep-alive check method by a WUR STA according to one embodiment of the present invention.

FIG. 17 illustrates the flow of the operation of a WUR keep-alive timer and a keep-alive check method by a WUR STA according to one embodiment of the present invention. The method illustrated in FIG. 17 corresponds to passive keep-alive checking.

According to the passive keep-alive check method, the WUR STA attempts to detect whether there is a WLAN frame (e.g., a beacon frame, a broadcast/multicast frame, a unicast frame transmitted to another WLAN STA, or a frame transmitted to the STA) transmitted from a transmitter (e.g., an AP) over a certain period of time through a WLAN transceiver of the WUR STA. When a frame transmitted from the AP is detected/received within the certain period of time, the WUR STA considers that the WUR STA is associated with the AP or is in the transmission range of the AP, turns off the WLAN transceiver (e.g., an 802.11 transceiver), and operates in a WUR mode. When a frame transmitted from the AP is not detected/received within the certain period of time, the WUR STA searches for the AP again.

For example, according to the passive keep-alive check method, the WUR STA may attempt to detect an intra-BSS frame transmitted from a BSS associated with the WUR STA by monitoring a channel through the WLAN transceiver, and may assume that the WUR STA is still associated with the intra-BSS frame when an intra-BSS frame is detected. When no intra-BSS frame is detected, the WUR STA may actively/passively scan an AP of the associated BSS and/or another AP currently located around the WUR STA.

According to the passive keep-alive check method, instead of waking up the WLAN transceiver due to the expiration of the keep-alive timer and then immediately performing an active/passive scanning, the WUR STA wakes up the WLAN transceiver, monitors a channel over a certain period of time, and performs a procedure for passively identifying the existence of an AP.

When the WUR STA identifies the existence of an AP within the certain period of time, the WUR STA does not need to perform channel access (e.g., transmit a WLAN frame and/or receive an ACK frame), thus saving the power of the WUR STA and not increasing channel congestion.

Referring to FIG. 17, the WUR STA turns off the WLAN transceiver and turns on a WUR (1705). When the WUR is turned on, the WUR STA starts the WUR keep-alive timer (1710).

The WUR STA monitors a WUR band through which a WUR signal/packet is transmitted through the WUR. The WUR band may correspond to a band narrower than a WLAN band for WLAN frame transmission. For example, the WUR band may be a 4/5/6-MHz channel, which is narrower than 20 MHz. When the WUR band is 4 MHz, the WUR signal/packet may be mapped onto 13 tones/subcarriers included in 4 MHz. The WLAN band may be, for example, 20/40/80/80+80 MHz, but is not limited thereto.

The WUR STA checks whether the WUR keep-alive timer expires while monitoring the WUR band through the WUR (1715). When the WUR STA receives a WUR packet from the AP, the WUR STA determines whether the received WUR packet is a WUR packet transmitted to/intended for the WUR STA (1720, 1725). A packet transmitted to/intended for the WUR STA is not necessarily limited to a unicast WUR packet (e.g., an SU WUR packet) as described above and may include a multicast/broadcast WUR packet (e.g., an MU WUR packet) to wake up a plurality of WUR STAs. It may be determined whether the WUR packet is a WUR packet transmitted to/intended for the WUR STA through transmitter/receiver information included in the WUR packet, for example, address/identifier information. For example, the WUR packet may include at least one of STA ID information (e.g., AID/Partial AID), a broadcast/multicast ID, a group ID, a BSS ID, a BSS color, and an MAC address but is not limited thereto.

When the received WUR packet is a packet transmitted to/intended for another STA or a WUR management frame (e.g., a WUR beacon frame) periodically transmitted, the WUR STA resets the WUR keep-alive timer (1730). For example, when the received WUR packet is transmitted from the AP associated with the WUR STA but is a packet directed to a different WUR STA or a WUR beacon frame periodically broadcast, the WUR STA does not need to wake up the WLAN transceiver. In this case, the WUR STA has confirmed that the WUR STA is still in the coverage of the AP and thus can maintain the WUR mode. In addition, the WUR STA may reset the WUR keep-alive timer, thereby restarting the WUR keep-alive timer from the time at which the existence of the AP has been confirmed last.

When the received WUR packet is transmitted to/intended for the WUR STA, the WUR STA suspends the WUR keep-alive timer (1735), turns on the WLAN transceiver, and transmits/receives a WLAN frame (1740).

When the WUR STA fails to detect a WUR packet and the WUR keep-alive timer expires, the WUR STA turns on the WLAN transceiver to perform a keep-alive check procedure (1715, 1745).

The WUR STA monitors a WLAN channel through the WLAN transceiver for a certain period of time and attempts to detect a WLAN frame. The frame that the WUR STA attempts to detect may be, for example, a frame transmitted by the AP associated with the WUR STA or an intra-BSS frame, but is not limited thereto.

When the WUR STA detects an intra-BSS frame within the certain period of time and the detected intra-BSS frame is not a frame to transmit downlink data to the WUR STA, to request uplink transmission from the WUR STA, or to request a response, the WUR STA may return to the WUR mode. For example, the WUR STA may turn off the WLAN transceiver and may turn on the WUR (1755).

However, when the WUR STA fails to detect an intra-BSS frame within the certain period of time, the WUR STA performs AP scanning (1760). As a result of AP scanning, when the associated AP is found again, the WUR STA returns to the WUR mode. However, when the associated AP is not found, the WUR STA can perform association with a newly discovered AP.

Figure 18:
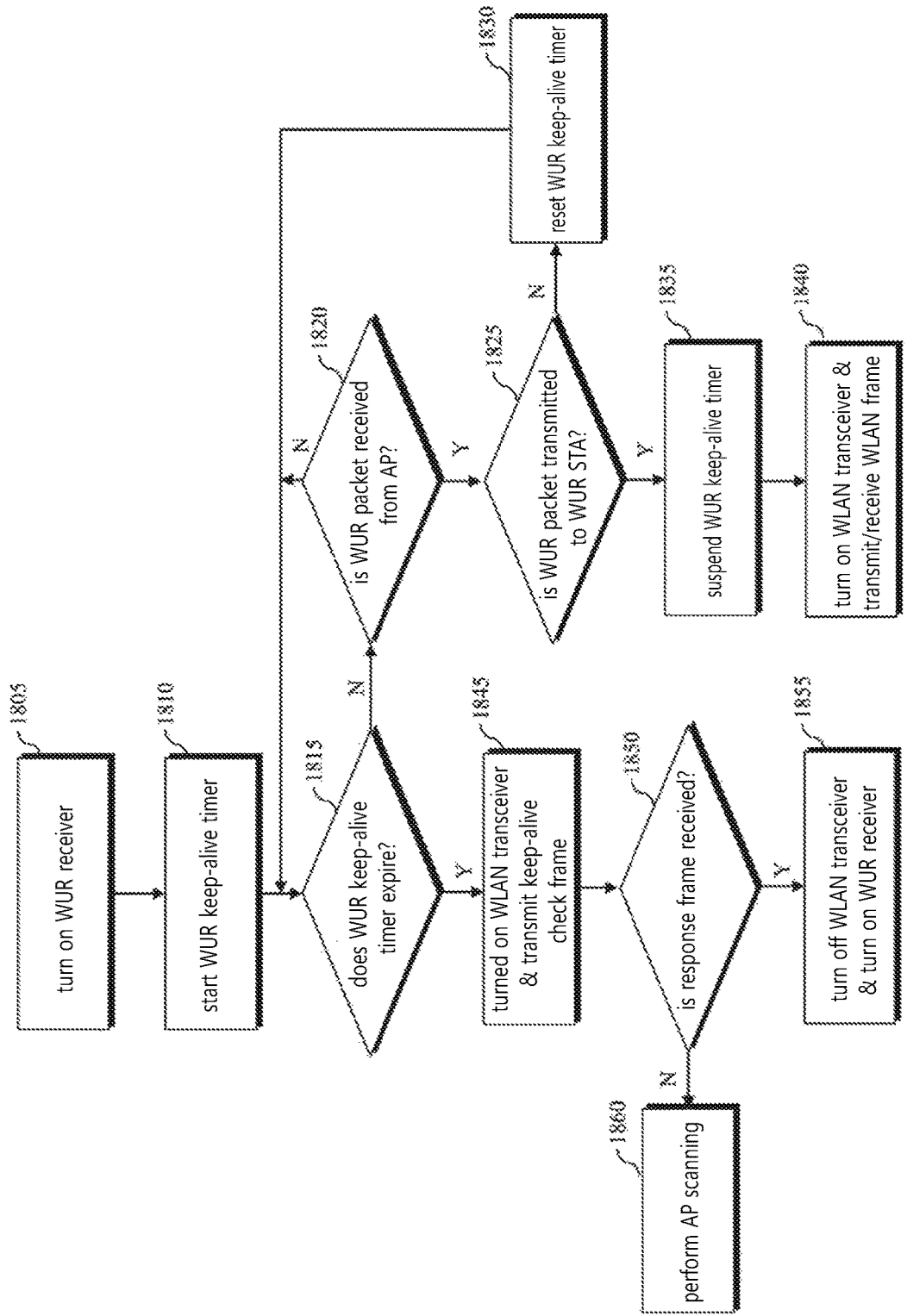
FIG. 18 illustrates the flow of the operation of a WUR keep-alive timer and a keep-alive check method by a WUR STA according to one embodiment of the present invention.

FIG. 18 illustrates the flow of the operation of a WUR keep-alive timer and a keep-alive check method by a WUR STA according to another embodiment of the present invention. The method illustrated in FIG. 18 corresponds to active keep-alive checking. Operations 1805 to 1840 in FIG. 18 are the same as operations 1705 to 1740 in FIG. 17, and thus a description thereof is omitted.

According to the active keep-alive check method, the WUR STA that has turned on a WLAN transceiver transmits a WLAN frame for a keep-alive check to an AP (1845). The WLAN frame for the keep-alive check may be, for example, a PS-Poll frame, a probe request frame, an (re-)association request frame, or a newly defined control/management frame for a keep-alive check but is not limited thereto.

When the WUR STA receives a response to the keep-alive check frame from the AP, the WUR STA considers that the WUR STA is associated with the AP, turns off the WLAN transceiver, and operates in the WUR mode (1855).

However, when the WUR STA does not receive a response to the keep-alive check frame from the AP, the WUR STA scans the AP (1860).

When a frame that the WUR STA transmits to the AP for a keep-alive check is a newly defined management request frame, the WUR STA may consider that the WUR STA is associated with the AP when receiving a management response frame or an ACK frame from the AP. The management response frame or the ACK frame from the AP may include information instructing the WUR STA to enter the WUR mode (e.g., a WUR mode change ON indication). Upon receiving the response frame including the information instructing the WUR STA to enter the WUR mode, the WUR STA may turn off the WLAN transceiver and may enter the WUR mode. As a response frame from the AP, a WUR mode change response frame may be newly defined. When the management response frame or the ACK frame from the AP is defined not to include the information instructing the WUR STA to enter the WUR mode and does not indicate that there is a downlink frame to be transmitted to the WUR STA (e.g., a more data field is set to 0), the WUR STA may turn off the WLAN transceiver and may enter the WUR mode upon receiving the management response frame or the ACK frame.

In another example, when the WUR STA transmits a PS-Poll frame for a keep-alive check, a response from the AP may be an ACK frame or a data frame after SIFS. When the WUR STA transmits a probe request frame for a keep-alive check, a response from the AP may be a probe response frame. When the WUR STA transmits an (re-)association request for a keep-alive check, a response from the AP may be an (re-)association response frame. These response frames from the AP, for example, the ACK frame, a block ACK frame, a probe response frame, and the (re-)association response frame, may include WUR mode change ON indication information.

When the WUR STA receives a WUR packet while operating in the WUR mode, a WUR transmitter (e.g., the AP) may include WUR transmitter information in the WUR packet so that the WUR STA can determine whether the WUR packet is transmitted from the AP associated with the WUR STA. For example, the WUR transmitter information may include at least one of a BSSID (e.g., 48 bits), a WUR transmitter MAC address, a partial BSSID (e.g., 9 bits), and a BSS color (e.g., 6 bits). The WUR transmitter information may be transmitted via a transmitter address part in the WUR packet or may be transmitted implicatively via a different part (e.g., XORed to a CRC and transmitted).

In the foregoing WUR keep-alive timer operation method, the WUR packet is not limited to a specific packet, such as a packet transmitted from the AP to wake up the WUR STA. For example, the WUR packet may include a WUR packet transmitted for the WUR STA in the WUR mode to synchronize with the AP, such as a WUR beacon frame. For example, the WUR keep-alive timer operation method according to the embodiment of the present invention may be applied to both the WUR packet to wake up the WUR STA and the WUR beacon frame, may be performed only based on the WUR beacon frame, or may be performed only based on the WUR packet to wake the WUR STA.

For example, assuming that the WUR keep-alive timer operation method is limited to the reception of a WUR beacon frame, the WUR STA starts the WUR keep-alive timer when starting the WUR mode. When the WUR STA receives a WUR beacon frame from the AP before the WUR keep-alive timer expires, the WUR STA resets the WUR keep-alive timer. When the WUR STA receives a WUR packet to wake up the WUR STA before the WUR keep-alive timer expires, the WUR STA suspends the WUR keep-alive timer and wakes up the WLAN transceiver. When the WUR STA does not receive any WUR beacon frame during the duration of the WUR keep-alive timer, the WUR STA may perform a keep-alive check procedure.

In another example, when the WUR keep-alive timer operation method is performed in consideration of both a WUR beacon frame and a WUR packet to wake up the WUR STA (e.g., a broadcast/multicast/unicast wake-up packet), for example, in consideration of any WUR packet that the WUR STA in the WUR mode can receive, if the WUR STA receives neither a WUR beacon frame nor a WUR packet to wake up the WUR STA from the AP associated with the WUR STA during the duration of the WUR keep-alive timer, the WUR STA may perform a keep-alive check procedure.

WUR keep-alive timer information may be received from the AP through a primary connectivity radio (i.e., WLAN) before the WUR STA enters the WUR mode.

Figure 19:
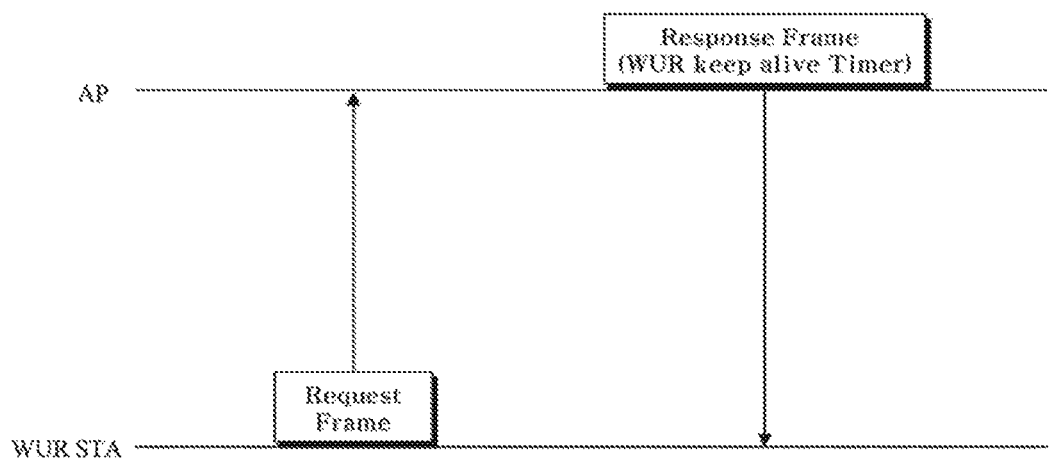
FIG. 19 illustrates an example in which a WUR STA receives WUR keep-alive timer information from an AP.

FIG. 19 illustrates an example in which a WUR STA receives WUR keep-alive timer information from an AP.

An AP provides WUR keep-alive timer information to a WUR STA via a primary connectivity radio (e.g., WLAN) before the WUR STA enters the WUR mode. The WUR keep-alive timer information may directly indicate a timer value that the WUR STA needs to set in the WUR keep-alive timer or may indicate a parameter that the WUR STA uses to determine a timer value.

Referring to FIG. 19, when the WUR STA transmits a request frame to the AP through the WLAN, the AP transmits a response frame to the WUR STA through the WLAN. The response frame from the AP includes WUR keep-alive timer information.

A request/response procedure illustrated in FIG. 19 may be performed, for example, by adding the WUR keep-alive timer information to a response frame of an existing WLAN procedure, such as a probe request/response procedure or an association request/response procedure. Alternatively, the WUR keep-alive timer information may be provided through a response frame (e.g., a WUR mode response frame) newly defined to negotiate the WUR mode. For example, the WUR keep-alive timer information may be provided through an association response frame or a WUR mode response frame, but is not limited thereto.

In another example, when the WUR STA transmits a frame indicating that the WUR STA will enter the WUR mode to the AP immediately before entering the WUR mode, the AP may transmit a response frame including the WUR keep-alive timer information in response. The response frame from the AP may be, for example, an ACK frame, a block ACK frame, a newly defined ACK/BA frame, a newly defined control/management frame, or the like.

Unlike in the foregoing embodiments, instead of using a WUR keep-alive timer or a specified time, when the WUR STA fails to receive a WUR beacon frame N times or more in succession, a WUR keep-alive check procedure may be performed. The AP may provide the value of N to the WUR STA through the WLAN. For example, the value of N may be provided to the WUR STA in the same manner as used for providing the WUR keep-alive timer information described above.

When receiving the value of N from the AP, the WUR STA may turn on a WLAN transceiver and may perform a WUR keep-alive check if missing a WUR beacon frame N times in succession in the WUR mode. In order to determine whether the WUR STA has missed a WUR beacon frame, that is, whether the WUR STA failed to receive the WUR beacon frame at the transmission timing of the WUR beacon frame, the WUR STA needs to be able to know the transmission timing or the transmission period of the WUR beacon frame. To this end, the AP may signal the transmission timing or the transmission period of the WUR beacon frame to the WUR STA.

The value of the WUR keep-alive timer may be determined by a new method, or a period predefined in the WLAN may be reused as the value of the WUR keep-alive timer. The period predefined in the WLAN may be, for example, a BSS MAX idle period, a BSS MAX idle period using a unified scaling factor, or a listen interval, but is not limited thereto. For example, when the WUR STA operating in the WUR mode fails to receive a WUR signal (e.g., a WUR beacon frame or wake-up packet) from the associated AP during a BSS MAX idle period transmitted by the AP, the WUR STA may consider that the WUR STA is disconnected from the AP. The WUR STA may then perform a WUR keep-alive check procedure.

According to another embodiment of the present invention, a keep-alive check procedure, which the WUR STA performs after waking up the WLAN transceiver due to the expiration of the WUR keep-alive timer, may be omitted. For example, when the WUR STA in the WUR mode fails to receive a WUR-related packet (e.g., a WUR beacon or a wake-up packet) from the associated AP during a predetermined period of time (e.g., the duration of the WUR keep-alive timer), the WUR STA may wake up the WLAN transceiver and may immediately perform a passive/active scanning procedure to find the AP again.

Figure 20:
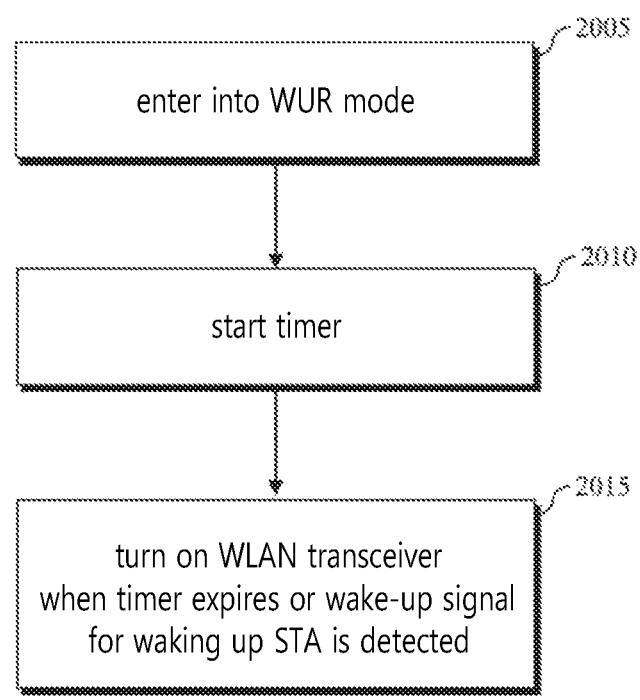
FIG. 20 illustrates a method in which a STA operates in the WUR mode and a method in which the AP supports the method according to one embodiment of the present invention.

FIG. 20 illustrates a method in which a STA operates in the WUR mode and a method in which the AP supports the method according to one embodiment of the present invention. Descriptions overlapping with those mentioned above may be omitted.

Referring to FIG. 20, the STA enters the WUR mode by turning off a WLAN transceiver and turning on a WUR (2005).

As entering the WUR mode, the STA starts a timer (e.g., a WUR keep-alive timer) (2010).

When the timer expires or a wake-up signal to wake up the STA is detected through the WUR, the STA turns on the WLAN transceiver (2015).

The timer may indicate the remaining time for which the STA can remain in the WUR mode until receiving a predetermined WUR signal to confirm the presence of an AP associated with the STA.

The predetermined WUR signal to confirm the presence of the AP may include at least one of a WUR beacon frame and a wake-up signal to wake up another STA.

The predetermined WUR signal to confirm the presence of the AP may include at least one of a basic service set identifier (BSSID), an MAC address, a partial BSSID, and a BSS color of the AP.

When the predetermined WUR signal to confirm the presence of the AP is received before the timer expires, the STA may reset the timer to an initial value and may remain in the WUR mode.

The initial value of the timer may be a value that the STA receives from the AP using the WLAN transceiver before entering the WUR mode or a value determined based on the transmission period of the WUR beacon frame.

When the WLAN transceiver is turned on due to the expiration of the timer, the STA may attempt to detect an intra-BSS frame through the WLAN transceiver for a certain period of time, and may return to the WUR mode or may perform an active/passive AP scanning procedure depending on whether the intra-BSS frame is detected.

Alternatively, when the WLAN transceiver is turned on due to the expiration of the timer, the STA may request a response from the AP through the WLAN transceiver, and may return to the WUR mode or may perform an active/passive AP scanning procedure depending on whether the response is received from the AP.

Figure 21:
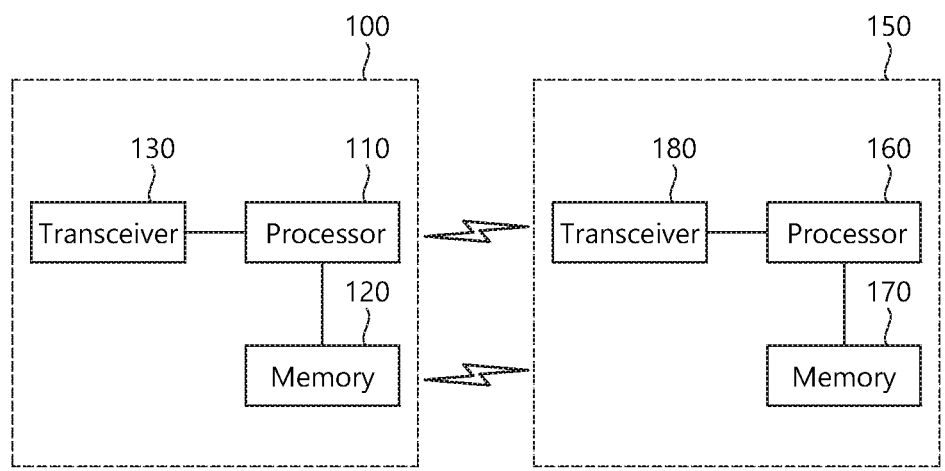
FIG. 21 is a diagram describing a device for implementing the above-described method.

FIG. 21 is a diagram describing a device for implementing the above-described method.

A wireless device (800) of FIG. 21 may correspond to the specific STA of the above description, and the wireless device (850) may correspond to the AP of the above description.

STA (800) may include a processor (810), a memory (820), and a transmitting/receiving unit (830), and AP (850) may include a processor (860), a memory (870), and a transmitting/receiving unit (880). The transmitting/receiving unit (830, 880) transmits/receives a radio signal and may be operated in a physical layer of IEEE 802.11/3GPP, and so on. The processor (810, 860) may be operated in the physical layer and/or MAC layer and may be operatively connected to the transmitting/receiving unit (830, 880). The processor (810, 860) may perform a UL MU scheduling procedure mentioned above.

The processor (810, 860) and/or the transmitting/receiving unit (830, 880) may include application-specific integrated circuit (ASIC), other chipset, logic circuit and/or data processor. The memory (820, 870) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (820, 870) and executed by the processor (810, 860). The memory (820, 870) can be implemented (or positioned) within the processor (810, 860) or external to the processor (810, 860). Also, the memory (820, 870) may be operatively connected to the processor (810, 860) via various means known in the art.

The transmitting/receiving unit (830) of the STA may include a transmitter (not shown) and a receiver (not shown). The receiver may include a WLAN receiver to receive a WLAN signal and a WUR to receive a WUR signal.

The transmitting/receiving unit (880) of the AP may include a transmitter (not shown) and a receiver (not shown). The transmitter of the AP may correspond to an OFDM transmitter. The AP may reuse the OFDM transmitter to transmit a WUR payload in the OOK scheme. For example, as described above, the AP may OOK-modulate the WUR payload via the OFDM transmitter.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

The present invention may be applied to various wireless communication systems including an IEEE 802.11 system.

What is claimed is:

1. A method in which a station (STA) operates in a wake-up receiver (WUR) mode in a wireless local area network (WLAN) system, the method comprising:
    entering a WUR mode by turning off a WLAN transceiver of the STA and turning on a WUR of the STA;
    in response to the entering the WUR mode, starting a timer; and
    turning on the WLAN transceiver of the STA when the timer expires or a wake-up signal to wake up the STA is detected through the WUR,
    wherein the timer represents information related to a remaining time for which the STA is able to remain in the WUR mode until receiving a predetermined WUR signal to confirm presence of an access point (AP) associated with the STA, and
    wherein, based on the predetermined WUR signal confirming the presence of the AP is received before the timer expires, the STA resets the timer to an initial value and remains in the WUR mode.

2. The method of claim 1, wherein the predetermined WUR signal to confirm the presence of the AP comprises at least one of a WUR beacon frame and a wake-up signal to wake up another STA.

3. The method of claim 2, wherein the predetermined WUR signal to confirm the presence of the AP comprises at least one of a basic service set identifier (BSSID), an MAC address, a partial BSSID, and a BSS color of the AP.

4. The method of claim 1, wherein the initial value of the timer is a value that the STA receives from the AP using the WLAN transceiver before entering the WUR mode or a value determined based on a transmission period of a WUR beacon frame.

5. The method of claim 1, further comprising:
    when the WLAN transceiver is turned on due to expiration of the timer,
    attempting to detect an intra-basic service set (BSS) frame through the WLAN transceiver for a certain period of time; and
    returning to the WUR mode or performing an AP scanning procedure depending on whether the intra-BSS frame is detected.

6. The method of claim 1, further comprising:
    when the WLAN transceiver is turned on due to expiration of the timer,
    requesting a response from the AP through the WLAN transceiver; and
    returning to the WUR mode or may performing an AP scanning procedure depending on whether the response is received from the AP.

7. A station (STA) operating in a wake-up receiver (WUR) mode in a wireless local area network (WLAN) system, the STA comprising:
    a WLAN transceiver;
    a WUR; and
    a processor configured to enter a WUR mode by turning off the WLAN transceiver and turning on the WUR, start, by the WUR, a timer in response to the entering the WUR mode, and turn on the WLAN transceiver of the STA when the timer expires or a wake-up signal to wake up the STA is detected through the WUR, wherein the timer represents information related to a remaining time for which the STA is able to remain in the WUR mode until receiving a predetermined WUR signal to confirm presence of an access point (AP) associated with the STA, and wherein, based on the predetermined WUR signal confirming the presence of the AP is received before the timer expires, the WUR resets the timer to an initial value and remains in the WUR mode.

8. The STA of claim 7, wherein the predetermined WUR signal to confirm the presence of the AP comprises at least one of a WUR beacon frame and a wake-up signal to wake up another STA.

9. The STA of claim 8, wherein the predetermined WUR signal to confirm the presence of the AP comprises at least one of a basic service set identifier (BSSID), an MAC address, a partial BSSID, and a BSS color of the AP.

10. The STA of claim 7, wherein the initial value of the timer is a value that the processor receives from the AP using the WLAN transceiver before entering the WUR mode or a value determined based on a transmission period of a WUR beacon frame.

11. The STA of claim 7, wherein when the WLAN transceiver is turned on due to expiration of the timer, the processor attempts to detect an intra-basic service set (BSS) frame through the WLAN transceiver for a certain period of time, and returns to the WUR mode or performs an AP scanning procedure depending on whether the intra-BSS frame is detected.

12. The STA of claim 7, wherein when the WLAN transceiver is turned on due to expiration of the timer, the processor requests a response from the AP through the WLAN transceiver, and returns to the WUR mode or performs an AP scanning procedure depending on whether the response is received from the AP.

* * * * *